Patented July 5, 1932

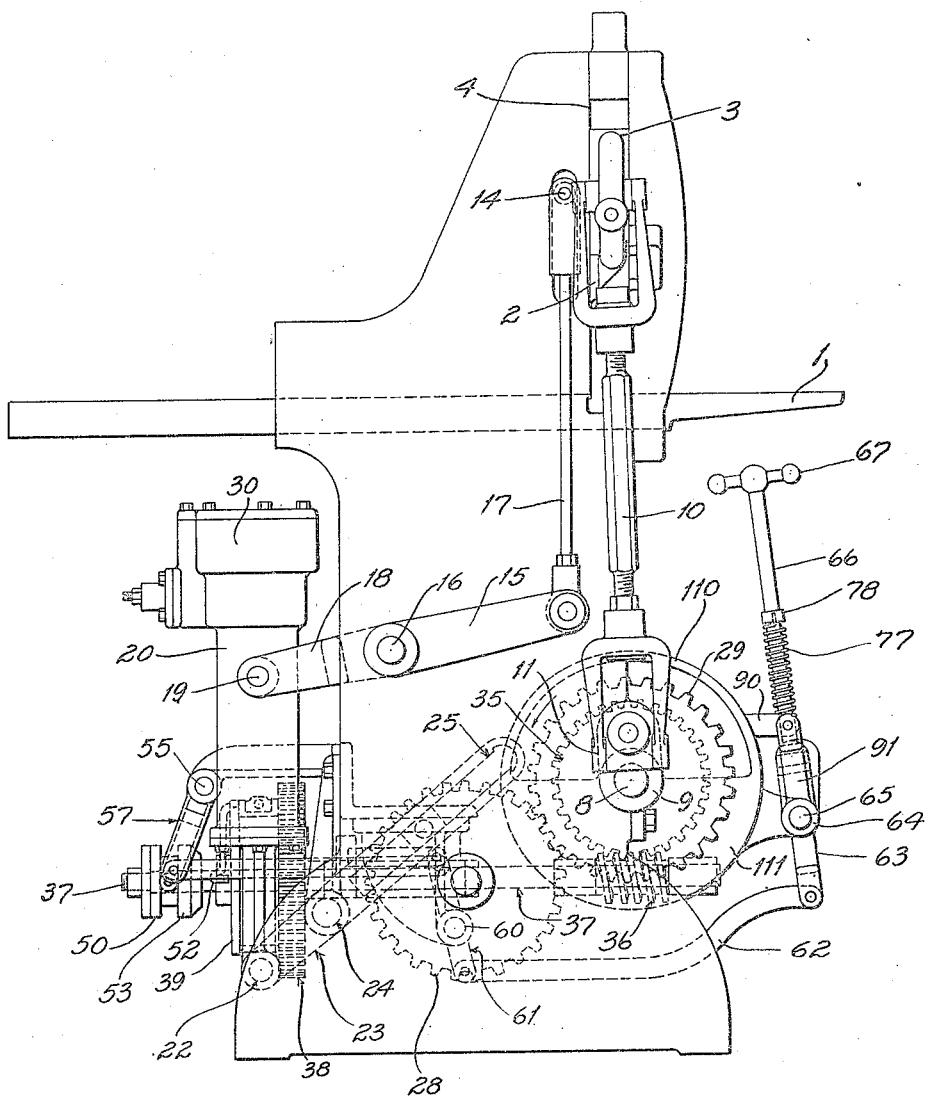

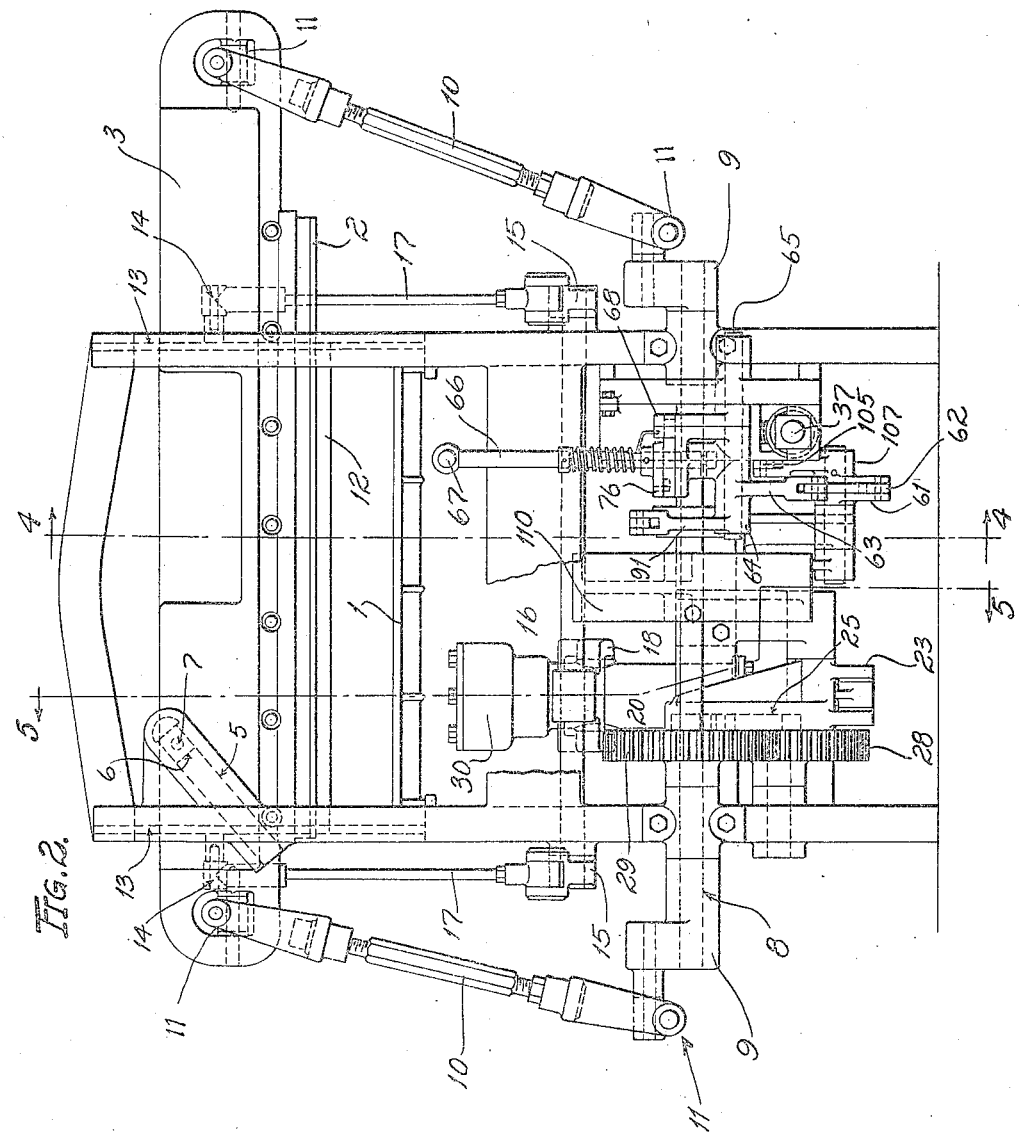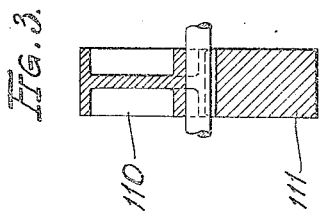

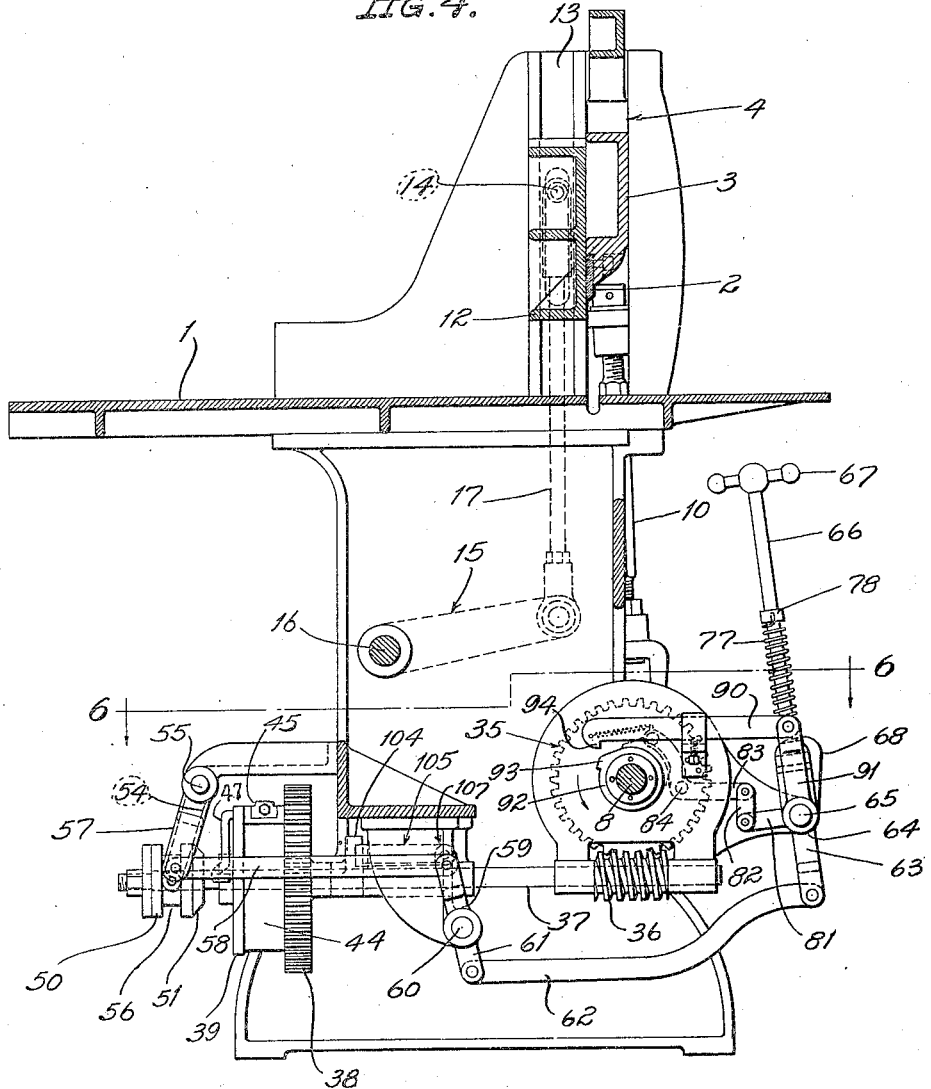

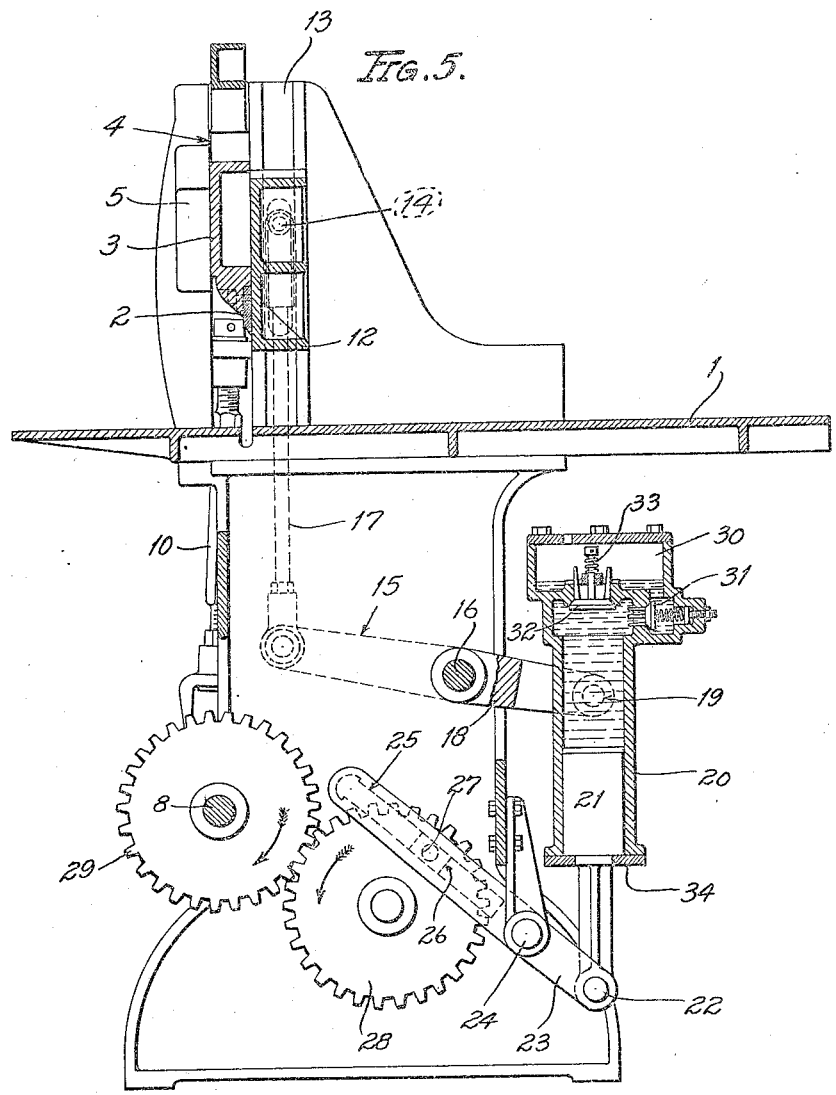

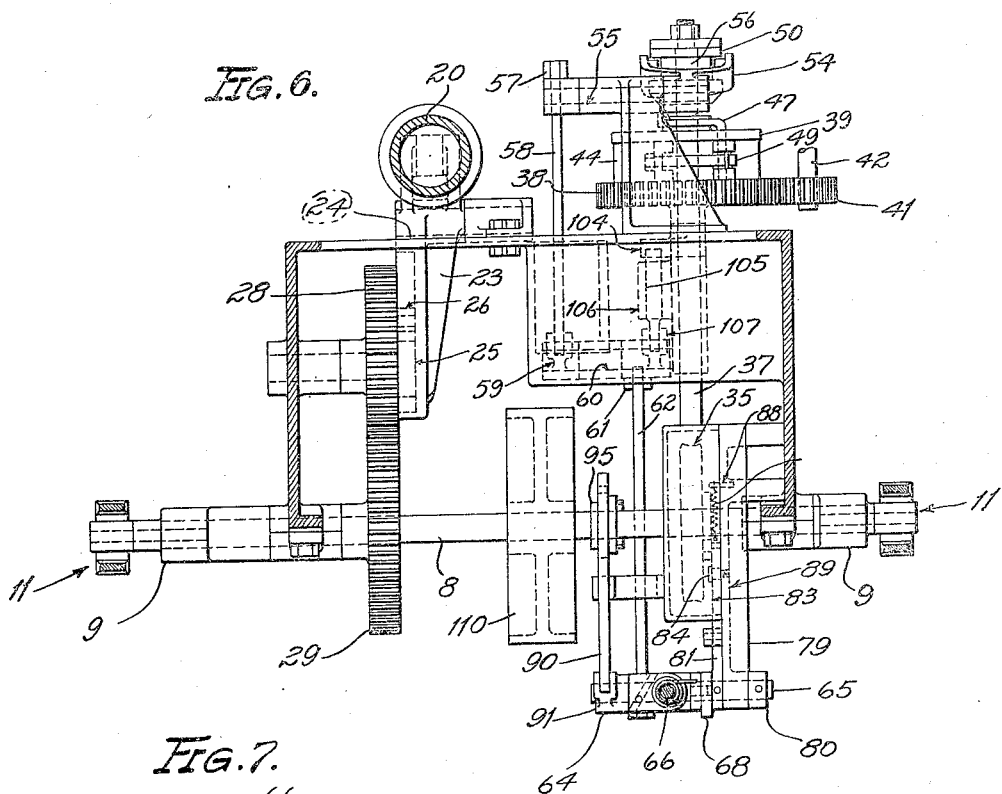
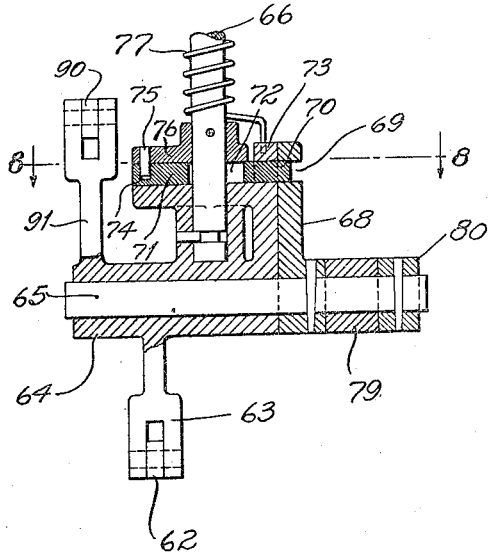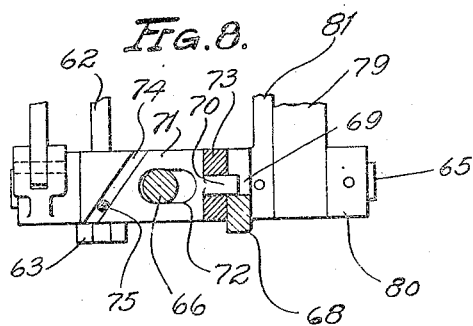

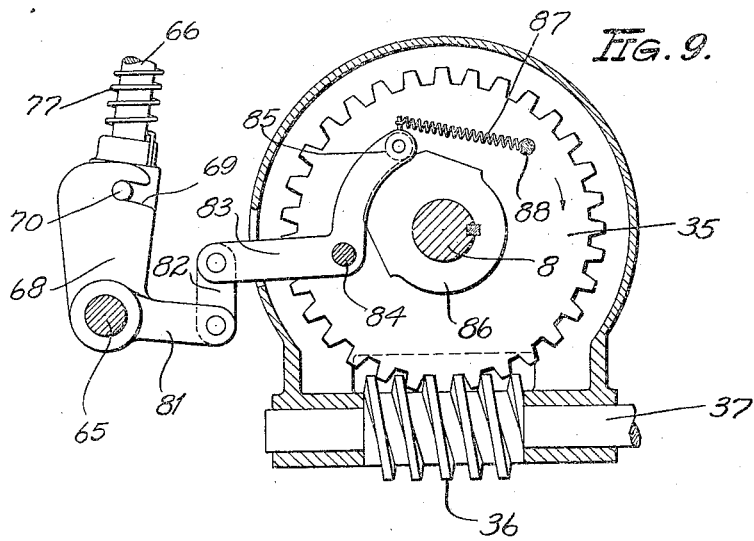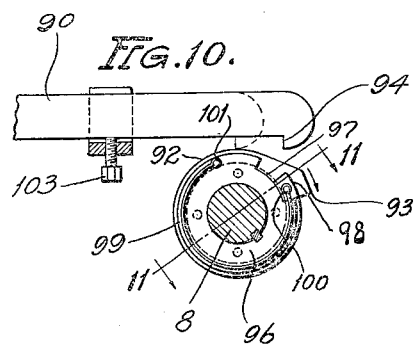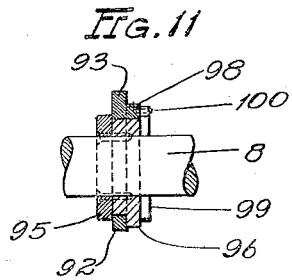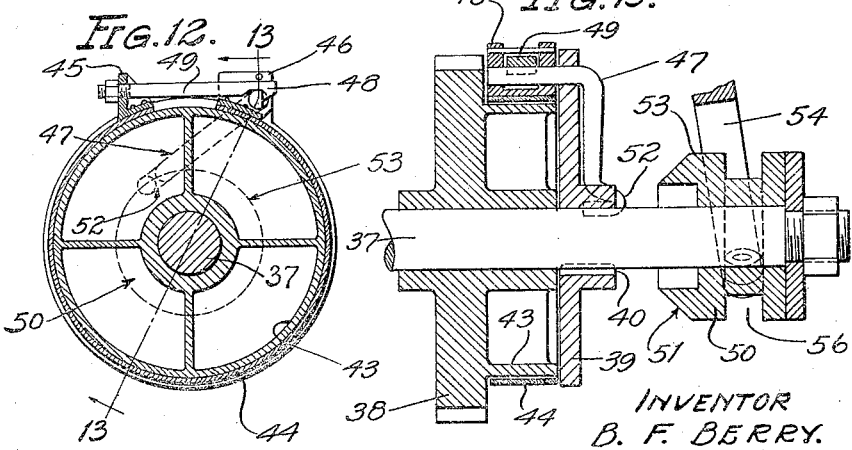

1,865,814

UNITED STATES PATENT OFFICE

BENJAMIN F. BERRY, OF ST. LOUIS, MISSOURI, ASSIGNOR TO BERRY MACHINE COMPANY, OF ST. LOUIS, MISSOURI, A CORPORATION OF MISSOURI

STARTING AND STOPPING DEVICE

Application filed September 23, 1927. Serial No. 221,447.

This invention relates to mechanism adapted for use in starting and stopping a machine, one of the objects being to prevent accidental starting of the machine. Another object is to positively stop the machine at a predetermined time and to thereby avoid the danger of an unexpected additional movement. These features may be used in a machine that is started by hand and then automatically stopped after performing a given operation. For example, I have shown the invention applied to a paper cutter including a large knife which cuts the paper held by a clamp, the knife and clamp being actuated by mechanical power to perform the cutting operation and to then stop in positions above the paper. However, it is to be understood that the invention is not limited to a machine of this kind.

Prior to the present invention, paper cutters and other machines have been provided with automatic stopping devices, and the operators depend upon these devices, so a failure to stop the mechanism might result in serious injury, especially in a cutting machine in which the operator's hand or arm is placed under the knife to remove the cut material. Therefore, the object of the invention is to produce an automatic safety device which will positively stop the transmission of power at a predetermined period, even when subjected to the many very unusual conditions likely to occur in a machine controlled by different persons. I also desire to eliminate the danger of accidental operation by a person unfamiliar with the means for controlling the machine.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Briefly stated, the apparatus herein described includes a starting member moved by the operator to start the machine, and two automatic stopping devices adapted to stop the machine when the operating shaft makes one revolution. Under certain conditions, one of the automatic stopping devices might fail to perform its function, and in this event the other automatic device will stop the machine.

The manually controlled starting member is primarily locked in its idle position, and to start the machine it is necessary to first unlock this member by moving it in one direction, and to then move it in another direction for the purpose of transmitting power to the machine. This eliminates one element of danger that might arise from an act of a person unfamiliar with the machine, or by an unintentional or careless act of the operator. When the predetermined operations of the machine are completed, the automatic device restores the starting member and locks it in its idle position so the machine cannot be again placed in operation until the starting member is deliberately unlocked and shifted.

If the operator should shift the starting member to its active position to start the machine and then try to hold it in this position the automatic mechanism will restore the starting member and thereby stop the machine, regardless of the act of the operator. In the particular mechanism I have shown, this involves the use of two automatic stopping devices, one being normally effective to stop the machine and to lock the starting member, and the other being effective when the locking elements are so held that the normally effective device would fail to perform its function. Another advantage of the two automatic stopping devices lies in the fact that some other element of one device might be broken or out of order, and in this event the other device will stop the transmission of power.

The automatic devices herein described actuate a clutch which transmits power to the machine, and they also control a positive stopping device which prevents excess motion that might otherwise result from a defect in the clutch, or from momentum.

Fig. 1 is a side elevation of a cutting machine embodying the features of this invention.

Fig. 2 is a front elevation with a portion of the frame broken away.

Fig. 3 is a vertical section illustrating a fly wheel provided with a counterweight.

Fig. 4 is a vertical section on the line 4—4 in Fig. 2.

Fig. 5 is a vertical section taken approximately on the line 5—5 in Fig. 2.

Fig. 6 is a horizontal section on the line 6—6 in Fig. 4.

Fig. 7 is an enlarged detail view showing the means for locking the starting member in its idle position.

Fig. 8 is a section on the line 8—8 in Fig. 7.

Fig. 9 is an enlarged vertical section showing some of the elements of an automatic stopping device which restores and locks the starting member.

Fig. 10 is an enlarged detail view of parts of another automatic stopping device.

Fig. 11 is a section on the line 11—11 in Fig. 10.

Fig. 12 is an enlarged vertical section showing the friction members of a clutch through which power is transmitted to the machine.

Fig. 13 is a section taken approximately on the line 13—13 in Fig. 12.

1 designates a table to receive the paper or other material to be cut. A knife 2 is secured to a holder 3 adapted to slide in vertical guideways 4 (Figures 1, 4 and 5). The frame of the machine is provided with an inclined guideway 5 (Fig. 2) to receive a block 6 on a pin 7 carried by the knife holder 3 so as to guide the knife in an inclined course. An operating shaft 8 is provided at its ends with cranks 9, and these cranks are connected to the ends of the knife holder 3 by means of rods 10 having universal couplings 11 at their ends.

A clamping member 12 is mounted in vertical guides 13 at the rear of the knife. The means for operating this clamping member comprises pins 14 extending from its ends, arms 15 secured to the ends of a shaft 16, rods 17 connecting said arms to the pins 14, and an arm 18 extending from the shaft 16. The arm 18 is pivoted at 19 (Figures 1 and 5) to a cylinder 20 containing a piston 21 which is connected at 22 to a lever 23, the latter being fulcrumed at 24 and provided with a slot 25 to receive a block 26 (Fig. 5) carried by a crank pin 27 on a gear wheel 28. The operating shaft 8 is provided with a gear wheel 29 meshing with the gear wheel 28, so that power will be transmitted to the knife and clamping member at the same time.

The cylinder 20 (Fig. 5) contains a liquid and it has a chamber 30 at the top into which some of this liquid is displaced during the operation of the machine. A spring-pressed discharge valve 31 permits the liquid to pass from the cylinder 20 to the chamber 30 during upward stroke of the piston 21, and an inlet valve 32 permits the return of this liquid during the downward stroke. A spring 33 tends to retain the inlet valve 32 in its closed position.

During one revolution of the operating shaft 8, the cranks 9 at its ends move downwardly and then upwardly to impart corresponding movements to the knife holder 3 and its knife 2. At the same time, power is transmitted from the gear 29 to the gear 28 which carries the crank pin 27 (Fig. 5) so the slotted lever 23 is actuated to move both the piston 21 and cylinder 20 in an upward direction until the clamping member 12 contacts with the paper (not shown) on the table 1, thereby limiting the upward motion of the cylinder 20. The piston 21 continues its upward motion and forces fluid into the chamber 30 against the resistance offered by the spring-pressed discharge valve 31, so as to transmit pressure to the clamping member 12 during cutting operation. The clamping member 12 moves downwardly ahead of the knife and it remains in contact with the paper until the cutting operation is completed. Thereafter the piston moves downwardly in the cylinder until it strikes a flange 34 (Fig. 5) at the bottom of the cylinder. This part of the operation returns the liquid from the chamber 30 to the cylinder 20, and the continued downward motion of the piston forces the cylinder 20 downwardly to return the clamping member 12 to the elevated position shown in Fig. 5.

The piston 21 is actuated by the crank pin 27 (Fig. 5) which moves in a circular course to move the piston in a line parallel with the axis of the cylinder 20, but in transmitting this movement, the crank pin 27 moves toward and away from the fulcrum 24 of the lever 23, and owing to the variations in the leverage, the crank pin transmits an approximately uniform upward motion to the piston 21. As a consequence, the liquid is displaced from the cylinder at an approximately uniform velocity, and a corresponding uniform pressure is transmitted to the clamping member 12.

The knife and the clamping member are moved downwardly and then restored during one revolution of the operating shaft 8. In starting the machine the operator moves a lever, as will be hereafter described, to begin the transmission of movement to the shaft 8, and upon the completion of one revolution, this shaft is automatically stopped.

The means for transmitting power to the long shaft 8 comprises a worm gear 35 fixed to said shaft, and worm 36 meshing with said worm gear, said worm being fixed to a shaft 37 provided with a clutch device which appears in Figures 4, 6, 12 and 13. This clutch device includes a gear wheel 38 loosely mounted on the shaft 37, a disk 39 secured to the shaft by means of a key 40 which appears in Fig. 13, and certain elements whereby power is transmitted from the loose gear to the disk. The gear may be driven constantly through medium of a pinion 41 (Fig. 6) on a power shaft 42.

The means for transmitting power from the loose gear 38 to the disk 39 (Figures 12 and 13) comprises a circular flange 43 formed integral with the gear, a friction band 44 which almost entirely surrounds the flange 43, a substantially L-shaped bracket 45 fixed to one end of said band and an approximately U-shaped bracket 46 fixed to the other end. The bracket 46 is carried by a rod 47 (Figures 12 and 13) extending through the disk 39 having a flat face engaging a tooth 48 at one end of a rod 49, the other end of said rod being secured to the bracket 45, as shown in Fig. 12. Obviously, the rod 47 can be turned to cooperate with the tooth 48 (Fig. 12) in tightening the friction band 44 on the flange 43, and motion will then be transmitted from the loose gear 38 to the disk 39 which is keyed to the shaft as shown in Fig. 13. This will result in the transmission of movement to the knife and clamping member.

The means for operating the rod 47 to tighten the friction band 44 (Figures 12 and 13) comprises a shifter 50 slidably mounted on the shaft 37 and having a beveled annular face 51 adapted to contact with an extended portion 52 of the rod 47. When the shifter 50 is moved to the left from the position shown in Fig. 13, the beveled face will engage the extension 52, thereby moving said extension upwardly from the position shown in Figure 12, so as to turn the portion of the rod 47 which contacts with the tooth 48 on the connecting rod 49, thus tightening the band 44 on the flange 43.

When the band is tightened, the extension 52 lies on the peripheral face 53 of the shifter 50, and not on the beveled face 51, so the pressure of the rod 47 does not tend to restore the shifter. In stopping the machine, it is only necessary to move the shifter a slight distance to engage the extension 52 with the beveled face 51 and the pressure of this extension will then tend to restore the shifter.

The shifter 50 is moved by manually operated devices as will be hereafter described from an idle position shown in Figures 4 and 13 to an active position in contact with the extension 52, thereby starting the machine, and in stopping the machine, the shifter is restored to the positions shown in Figures 4 and 15. This shifter may, therefore, be termed a manually operated starting member, or an automatically operated stopping member.

The means for operating the shifter 50 includes an arm 54 (Figures 4, 6 and 13) fixed to a shaft 5 and having a forked lower end extending into an annular groove 56 in the shifter. The means for transmitting movement to the shaft 55 comprises an operating arm 57 (Figures 4 and 6) fixed to said shaft, a connecting bar 58 pivoted at one end to said arm 57 and having its opposite end pivoted to an arm 59 on the shaft 60, the latter having an arm 61 connected by means of a bar 62 to an arm 63 which extends downwardly from a hub 64 loosely mounted on a shaft 65. This loosely mounted hub 64 is shown most clearly in Fig. 7. An operating rod 66 extending from the hub 64 is provided with a handle 67 (Fig. 4) which is grasped by the operator to turn the hub 64 on the shaft 65, thereby engaging the clutch members to begin the transmission of power to the knife and clamping member. The operator can thus begin the transmission of power, but when the shaft 8 completes one revolution the loose hub 64 is automatically restored by mechanism hereafter described to release the clutch members, and thereby discontinue the transmission of power to the machine. This automatic release of the clutch members forms an important part of the invention, and it is positively accomplished in such a manner that there is no danger of an excess motion which would again move the knife and clamp toward the table. In other words, the operating shaft 8 makes only one revolution to complete the cutting operation and to restore the clamp and knife to their elevated positions.

Operators depend upon an automatic stopping device, so a failure of the automatic elements might result in serious injury. In some cases, an operator will quickly remove the cut paper by placing his arms under the knife and clamp while these elements are moving upwardly, and if the automatic device should fail, the knife and clamp will quickly move downward. In some instances the manually operated controlling rod 66 might be accidently held in its operative position, and in the old device of which I am aware this would result in an unexpected second operation which might injure the person in charge of the paper.

The safety device hereafter described includes the operating rod, or handle, 66 which is normally locked in the position that prevents the transmission of power through the clutch device. To actuate the machine it is necessary to first unlock the operating handle and to then pull it toward the operator. Power will then be transmitted through the clutch, and upon the completion of one revolution of the shaft 8, the operating handle will be automatically restored and locked in its idle position thereby releasing and locking the clutch. The operator can not hold the handle in its effective position, for it is very forcibly restored by the automatic device and then locked, so to obtain the second operation it is necessary to manually unlock the lever and to then move it toward the operator for the purpose of engaging the clutch members.

The means for locking the handle to prevent accidental operation of the machine comprises a wing 68 (Figures 7, 8 and 9) fixed to the shaft 65 and having a notch 69 to receive a locking pin 70 extending from a plate 71 carried by the hub 64. The rod 66, which forms part of the operating handle, is rotatably mounted in this hub as shown in Fig. 7, and the plate 71 has a slot 72 to receive the rod 66. This plate 71 is guided partly by the rod and partly by its locking pin 70 which slides in a flange 73 extending from the hub 64.

To release the locking pin 70 from the wing 68, the plate 71 (Figures 7 and 8) is provided with an inclined slot 74 to receive a pin 75 extending from an arm 76, the latter being fixed to the rod 66. This rod can be turned in one direction to withdraw the locking pin 70 from the wing 68 and in the opposite direction to restore the locking pin. The rod 66 is turned in one direction by hand to release the locking pin, and a spring 77 surrounding said rod tends to turn it in the opposite direction. One end of this spring is secured to the flange 73, as shown in Fig. 7, and the other end is secured to a collar 78 on the rod 66, as shown in Fig. 4.

Assuming for the present that the wing 68 (Fig. 7) may be held in a fixed position, it will be apparent that to start the machine it is necessary to first turn the rod 66 so as to release the locking pin 70, and to then move said rod for the purpose of turning the hub 64 which transmits motion to the clutch.

I will now describe the elements cooperating with the wing 68 to retain said wing in the fixed position when the machine is idle and to actuate said wing so as to restore the manually operated rod 66. These elements are shown most clearly in Figures 6, 7 and 9.

The wing 68 is fixed to the shaft 65 adapted to turn in the bearing 79 and equipped with a collar 80 to prevent longitudinal displacement of the shaft. An arm 81 extending from the wing (Fig. 9) is connected by means of a link 82 to a bell crank lever 83 fulcrumed at 84 and having a roll 85 which engages the periphery of a cam 86 on the shaft 8. A spring 87 connects the lever 83 to a stationary pin 88, and this spring tends to retain the roll 85 in contact with the cam. Fig. 6 shows that the fulcrum 84 of the lever 83 and the pin 88 at one end of the spring 87 are supported by a wall 89, and not by the gear 35.

Fig. 9 illustrates the positions of the lever 83 and cam 86 when the mechanism is at rest.

In starting the machine the first step is to turn the rod 66, thereby withdrawing the locking pin 70 from the wing 68. The rod 66 is then moved to the left from the position shown in Fig. 9 and when this rod is released the spring 77 around said rod will yieldingly force the locking pin 70 onto one side of the wing. The operation of unlocking and shifting the rod 66 is performed by hand to engage the clutch members in starting the machine. The shaft 8 then makes one complete revolution in the direction indicated by an arrow in Fig. 9. During the first half of this revolution, the cam 86 (Fig. 9) allows the spring 87 to transmit motion through the lever 83, link 82 and arm 81, to shift the wing 68 to the left until the notch 69 in said wing registers with the spring-pressed locking pin 70 which then occupies a position to the left of that shown in Fig. 9. The locking pin 70 then enters the notch 69, and immediately before the completion of the revolution of the shaft 8, the cam 86 restores the lever 83 to the position shown in Fig. 9, thereby restoring the wing 68 which cooperates with locking pin 70 to restore the operating rod 66. The hub 64 (Fig. 7) is of course restored with these members, and the clutch is released in response to the return movement of this hub.

At this point it should be understood that the clutch shifting elements, including operating rod 66 are primarily locked in their idle positions by means of the locking pin 70 which cooperates with the wing 68 as shown in Fig. 9. When the parts are thus locked the wing 68 cannot be moved to the left from the position shown in Fig. 9, and any attempt to impart such movement will merely transmit pressure from the bell crank lever 83 to the cam 86. Consequently, the clutch cannot be shifted to start the machine until the rod 66 is turned to withdraw the locking pin 70 from the notch 69, and this merely unlocks the clutch shifting mechanism. The rod 66 must then be shifted to engage the clutch members with each other, and upon the completion of one revolution of the shaft 8, the elements shown by Fig. 9 are automatically restored, so it is necessary to again unlock and shift the rod 66 to continue the operation of the machine.

If the operator merely holds the rod 66 when the machine is in operation, the elements shown by Fig. 9 will be forcibly restored by the power transmitted from cam 86, but it would be possible to hold the rod 66 in such a manner that the locking pin 70 would lie entirely beyond the wing 68, and in this event the automatic return movement of the wing 68 would not restore the rod 66 and the clutch would not be released. This might not be regarded as a probable condition, but the machine is to be used for many thousands of operations while in charge of various different persons, and it might be accidently operated by one unfamiliar with the controlling device, so it is important to entirely eliminate all danger of an unexpected excess motion.

I have therefore disclosed a second automatic stopping device which compensates for the foregoing defects in the first, and gives the advantage of two separate stopping devices, so that if one should fail to perform its function on account of breakage, or the like, the other device will stop the machine.

The additional, or auxiliary stopping device, (Figures 4, 6 and 7) comprises a stopping member in the form of a bar 90 pivoted to an arm 91 extending from the hub 64 which is operated as previously described to start and stop the machine. A ring 92, (Figures 4, 6, 10 and 11) surrounding the shaft 8, has a tooth 93 adapted to strike a shoulder 94 on the bar 90, to pull said bar to the left from the position shown in Fig. 4, thereby stopping the machine. The bar 90 is moved back and forth during the usual starting and stopping operations, and the tooth 93 on the ring 92 should not interfere with these movements. Therefore, when the machine is at rest the tooth 93 must lie beyond the path of the shoulder 94.

I will now describe the manner in which the tooth 93 cooperates with the shoulder 94 to release the clutch and to then move to the position below the shoulder. The ring 92 on which the tooth is formed (Figures 10 and 11) lies between collars 95 and 96 and one of these collars has a recess 97 to receive a lug 98 on the ring 92. A bow spring 99 (Figures 10 and 11) has one of its ends connected at 100 to the lug 98 and its other end connected at 101 to the collar 96. This spring normally retains the lug in one end of the recess 97 as shown in Fig. 10. When the clutch members are engaged with each other the shoulder 94 lies in the course of the tooth 93, as shown by dotted lines in Fig. 10. When this auxiliary device performs the function of stopping the machine the tooth 93 strikes the shoulder 94 and owing to the yielding connection formed by the spring 99 the tooth will then remain at rest until the opposite end of the recess 97 strikes the lug 98. The tooth will then be actuated to positively move the bar 90 a distance great enough to begin the operation of releasing the clutch shifter 50 (Figures 4 and 13) from the extension 52 of rod 47. When this extension presses upon the beveled face 51 of the shifter 50, the latter will be thrown independently of the tooth 93, and this additional motion due partly to momentum and partly to the pressure on the beveled face, will shift the bar 90 to the position shown by full lines in Fig. 10. The bow spring 99 will then shift the toothed ring 92 to the position shown in the same view and this is the idle, or starting, position of the toothed ring.

To separate the bar 90 from the toothed ring this bar rests upon a screw 103 (Fig. 10) which can be adjusted to obtain the desired cooperation of the shoulder 94 and tooth 93.

It will now be understood that the auxiliary starting device does not lock the operating handle and clutch elements in their idle positions, but it insures the desired stopping when the operating handle is so held that the locking pin 70 fails to cooperate with the wing 68 during the return stroke of said wing. In other words, one automatic stopping device is provided with a lock which prevents accidental operation of the starting lever and the other automatic stopping device overcomes an element of danger arising from the use of the lock. Moreover, if one automatic stopping device should fail to perform its function the other will accomplish the desired result.

When the clutch is released the mechanism tends to continue in motion in response to momentum, and under some conditions the friction elements of the clutch may fail to separate from each other so there is some danger of continued motion after the automatic clutch is actuated.

Therefore, the machine preferably includes a positive stopping device which I have shown in the form of a stop arm 104 (Figures 4 and 6) carried by the shaft 37, and the bolt 105 adapted to be shifted into the course of said arm. The bolt 105 is slidably mounted in a guide 106 (Fig. 6) and pivotally connected to an arm 107 which appears in Figures 2, 4 and 6, said arm being fixed to the shaft 60 which is actuated during the clutch shifting operations so as to move the bolt 105 into and out of the course of the stop arm 104. When the machine is at rest the stop arm 104 contacts with the bolt 105. In starting the machine the bolt 105 is withdrawn from the stop arm before the clutch member is actuated. In stopping the machine, the clutch shifting devices move the bolt 105 into the course of the stop arm.

The shaft 8 which drives the knife and clamp is provided with a fly wheel 110 (Figures 2 and 3) having a counterweight 111, and this weight lies at the bottom of the wheel when the knife and clamp occupy their elevated positions. Consequently, the counterweight tends to retain the clamp and knife in their elevated positions, and it also tends to equalize the power requirement in the operations of lifting and dropping the heavy clamp and knife.

I claim:

1. In a machine provided with a manually operated starting member movable from an idle position to an active position to start the machine, a locking device whereby said starting member is locked in its idle position, said locking device including a support movable with said starting member to start the machine, a locking member slidable in said support and operatively secured to said starting member, said starting member being adapted to turn in said support to unlock said locking member, and a spring tending to retain said locking member in its operative position.

2. In a machine provided with a manually operated starting member movable from an idle position to an active position to start the machine, an automatic stopping device including a restoring member having a locking member driven by the machine, and another locking member movable with said starting member and engaging said first mentioned locking member to return the starting member to its idle and locked position.

3. In a machine provided with a manually operated starting member movable from an idle position to an active position to start the machine, an automatic stopping device including a restoring member having a locking member driven by the machine, and another locking member movable with said starting member and engaging said first mentioned locking member to return the starting member to its idle position, said starting member being movable independently of said first mentioned locking member to start the machine.

4. In a machine provided with a manually operated starting member movable from an idle position to an active position to start the machine, an automatic stopping device including a restoring member driven by the machine, and a locking device connecting said starting member to said restoring member so as to return the starting member to its idle position.

5. In a machine provided with a manually operated starting member movable from an idle position to an active position to start the machine, an automatic stopping device including a restoring member driven by the machine, and a locking device connecting said starting member to said restoring member so as to return the starting member to its idle position, said locking device being movable independently of said restoring member to release the starting member therefrom.

6. In a machine provided with a manually operated starting member movable from an idle position to an active position to start the machine, an automatic stopping device including a restoring member driven in opposite directions in response to movements of the machine, and a manually operable locking device whereby said restoring member is automatically connected to said starting member.

7. In a machine provided with a manually operated starting member movable from an idle position to an active position to start the machine, an automatic stopping device including a restoring member driven by the machine to restore said starting member from said active position to said idle position, said restoring member being interlocked with said starting member when said starting member is in its idle position.

8. In a machine provided with a manually operated starting member movable from an idle position to an active position to start the machine, an automatic stopping device including a restoring member driven by the machine and detachably interlocked with said starting member, the starting member being movable in one direction to unlock said starting member from the restoring member, and said starting member being movable in another direction to start the machine.

9. In a machine provided with a manually operated starting member movable from an idle position to an active position to start the machine, an automatic stopping device including a cam driven by the machine, an oscillatory restoring member including a locking member driven by said cam, and a spring-actuated locking member whereby said restoring member and the first mentioned locking member is connected to said starting member.

10. In a machine provided with a manually operated starting member movable from an idle position to an active position to start the machine, a locking device whereby said starting member is locked in its idle position, an automatic stopping device whereby motion is transmitted through said locking device to stop the machine, and a second automatic stopping device driven independently of said locking device, each of said stopping devices being provided with means to shift said starting member to its idle position.

11. In a machine provided with a manually operated starting member movable from an idle position to an active position to start the machine, an automatic stopping device including a restoring member driven by the machine, and a locking device connecting said starting member to said restoring member so as to return the starting member to its idle position, and a second automatic stopping device whereby said starting member is returned independently of the connection formed by said locking device.

12. In a machine provided with a manually operated starting member movable from an idle position to an active position to start the machine, an automatic stopping device including a restoring member driven in opposite directions in response to movements of the machine, and a manually operable locking device whereby said restoring member is automatically connected to said starting member, and a second automatic stopping device, independent of said locking device, adapted to restore said starting member when the locking device s held in an ineffective position.

13. A machine provided with a clutch member movable to start and stop the machine, a movable stop member adapted to limit the motion of the machine, a manually operated handle connected to said members, a locking device whereby said clutch member, stop member and handle are locked to prevent the transmission of power to the machine, an unlocking device associated with said handle to unlock said locking device, said handle being movable in one direction to unlock said locking device and in another direction to shift said clutch member and stop member, an automatic stopping device including a member driven by the machine and adapted to engage said locking device to restore and lock the handle, and a second automatic stopping device, independent of said locking device, adapted to restore said handle.

In testimony that I claim the foregoing I hereunto affix my signature.

BENJAMIN F. BERRY.